United States Patent
Brown

(10) Patent No.: US 10,614,131 B2
(45) Date of Patent: Apr. 7, 2020

(54) METHODS AND APPARATUS OF AN IMMUTABLE THREAT INTELLIGENCE SYSTEM

(71) Applicant: Lookingglass Cyber Solutions, Inc., Baltimore, MD (US)

(72) Inventor: Bryan Wesley Brown, Baltimore, MD (US)

(73) Assignee: Lookingglass Cyber Solutions, Inc., Reston, VA (US)

( * ) Notice: Subject to any disclaimer, the term of this patent is extended or adjusted under 35 U.S.C. 154(b) by 568 days.

(21) Appl. No.: 15/335,275

(22) Filed: Oct. 26, 2016

(65) Prior Publication Data

US 2018/0113952 A1 Apr. 26, 2018

(51) Int. Cl.
*G06F 16/903* (2019.01)
*G06F 16/11* (2019.01)
*G06F 21/62* (2013.01)

(52) U.S. Cl.
CPC ...... *G06F 16/90335* (2019.01); *G06F 16/128* (2019.01); *G06F 21/6227* (2013.01)

(58) Field of Classification Search
None
See application file for complete search history.

(56) References Cited

U.S. PATENT DOCUMENTS

| | | | | |
|---|---|---|---|---|
| 6,438,560 B1 * | 8/2002 | Loen | ............... | G06F 16/289 707/769 |
| 2003/0145022 A1 | 7/2003 | Dingley | | |
| 2011/0167088 A1 * | 7/2011 | Warren | ............... | G06F 16/2246 707/781 |
| 2011/0258225 A1 * | 10/2011 | Taylor | ............... | G06F 16/2272 707/769 |
| 2011/0320496 A1 * | 12/2011 | Reid | ............... | G06F 16/2329 707/797 |
| 2013/0339297 A1 | 12/2013 | Chen | | |
| 2014/0047040 A1 | 2/2014 | Patiejunas et al. | | |

(Continued)

OTHER PUBLICATIONS

Wikipedia, "Triplestore," [online], Retrieved from the Internet: <URL: https://en.wikipedia.org/wiki/Triplestore> page was last edited Apr. 23, 2017, 3 pages.

(Continued)

*Primary Examiner* — Christopher J Raab
(74) *Attorney, Agent, or Firm* — Cooley LLP

(57) ABSTRACT

Apparatus and methods described herein relate to a processor that can convert intelligence data into a data structure, and that can store the data structure in a data store. The processor can calculate an identity value for the data structure. The data structure can be immutable such that data represented in the data structure is not modified. A query engine implemented by the processor can receive a request for intelligence status data, and can query an index data store for a set of identity values correlated with data included in the request. The query engine can retrieve, from the data store, intelligence status data correlated with each identity value in the set of identity values. The query engine can also return a snapshot data structure representing at least a portion of the intelligence status data correlated with each identity value in the set of identity values, in response to the request.

17 Claims, 8 Drawing Sheets

(56) References Cited

U.S. PATENT DOCUMENTS

2015/0220583 A1* 8/2015 Teletia ............... G06F 16/2272
707/696
2016/0127467 A1 5/2016 Mu et al.
2017/0235970 A1* 8/2017 Conner ............... G06F 21/6227
707/690

OTHER PUBLICATIONS

Datomic, "The fully transactional, cloud-ready, distributed database," [online], Retrieved from the Internet <URL: http://www.datomic.com>, ©2016 Cognitect, Inc., 2 pages.

Rusher, Jack, Radar Networks, "Triple Store," [online], Retrieved from the Internet: <URL: http://www.w3.org/2001/sw/Europe/events/20031113-storage/positions/rusher.html>, Nov. 13, 2003, 3 pages.

Hickey, Rich, InfoQ, "The Datomic InformationModel," [online], Retrieved from the Internet <URL: https://www.infoq.com/articles/Datomic-Information-Model>, Feb. 1, 2013, 9 pages.

Datomic, "Datomic Rationale," [online], Retrieved from the Internet <URL: http://www.datomic.com/rationale.html>, ©2016 Cognitect, Inc., 8 pages.

Extended European Search Report issued by the European Patent Office for Application No. 17198402.4, dated Mar. 5, 2018, 8 pages.

* cited by examiner

METHODS AND APPARATUS OF AN IMMUTABLE THREAT INTELLIGENCE SYSTEM

FIELD

One or more methods and apparatus described herein are generally related, for example, to improving the data storage and data processing efficiency of cybersecurity technologies.

BACKGROUND

In some known network systems, intelligence data representing status information regarding network entities and/or other entities can be maintained by an analyst to keep track of changes within a network. In such known network systems, however, updating status information can involve mutating currently-stored information relative to a network entity. For example, updating status information can involve reading data already stored in a data store, modifying the stored data, and storing the updated data in the data store. Such mutations of currently-stored information can both result in inefficient updating of status information, and can prevent an analyst from being able to store and/or retrieve previous status information, which can provide context for a current status of a network entity. Further, such mutations can involve additional time and data resources for updating caches that store recent status information. For example, updating status information in this manner can involve reviewing all data stored in a cache, deleting data that has been updated, and storing new or updated status information.

Accordingly, a need exists for methods and apparatus that efficiently provide information about the network (including network device data and intelligence data) to analysts in or accessing the network, without using resource-intensive techniques of updating status information about entities.

SUMMARY

In some implementations, an apparatus includes a processor that can convert intelligence data into at least one data structure, and can store the at least one data structure in a data store. The processor can calculate an identity value for each of the at least one data structure, so as to generate a first set of identity values. The at least one data structure can be immutable such that data represented in the at least one data structure is not modified. The apparatus can also include an intelligence query engine implemented by the processor. The intelligence query engine can receive a request for intelligence status data, and can query an index data store for a second set of identity values correlated with data included in the request. The index data store can store each identity value from the first set of identity values calculated for each of the at least one data structure. The intelligence query engine can retrieve, from the data store, intelligence status data correlated with each identity value in the second set of identity values. The intelligence query engine can also return a snapshot data structure representing at least a portion of the intelligence status data correlated with each identity value in the second set of identity values, in response to the request.

In another implementation, an apparatus includes a processor that can convert intelligence input into a set of immutable data structures, and that can generate an identity value for each immutable data structure from the set of immutable data structures. The processor can also query a data store using an identity value of an immutable data structure from the set of immutable data structures. The processor can then store the immutable data structure in an immutable data structure data store when the identity value is not found in the data store, and can store a copy of the identity value in the data store.

In another implementation, a process includes receiving intelligence data, and translating the intelligence data into a set of immutable data structures. The process further includes storing each immutable data structure in the set of immutable data structures in a immutable data structure data store. The process includes generating a snapshot data structure including a set of identifiers, where each identifier in the set of identifiers can be associated with an immutable data structure in the set of immutable data structures. The process includes receiving a request for the intelligence data, and generating an intelligence data timeline based on data included in the snapshot data structure. The process further includes sending a signal to cause rendering of a graphical representation of the intelligence data timeline in an interface.

DETAILED DESCRIPTION

In some implementations, raw data relating to assets (e.g., such as network assets, entities, persons, and/or the like) can be received by apparatuses and systems described herein. An intelligence ingestor (e.g., such as a threat intelligence ingestor) can process the raw data, so as to generate a number of data structures representing current status information for the assets. The data structures can be stored in a data store as immutable data structures. The intelligence ingestor can also generate unique identity values for each immutable data structure. When an analyst requests current status information for an asset, a query engine can match information in the request to identity values generated for immutable data structures. The identity values can be used to retrieve immutable data structures from a cache storing recent immutable data structures, and/or storing data structures that aggregate information from multiple immutable data structures. The query engine can then return the aggregated information, and/or immutable data structures, to the analyst for review. The query engine can also send historical information to the analyst, such that the analyst can view a timeline of status information associated with the assets.

An immutable data system can allow much greater efficiency and faster processing of data relating to assets, even while updates to data relating to the assets, and other relevant data, are being received by the system, substantially at the same time. Said another way, the use of immutable data structures allows for faster (and as a result, increased) processing and ingestion of incoming data and faster determinations as to the current status of a network asset in a network. Further, an immutable data system can allow faster updating and synchronizing of multiple sources of information. Specifically, because data can be immutable, if an entity is storing the data in a cache, that entity can update the data merely by saving new data as it is ingested, without needing to invalidate and/or modifying existing data in the cache. Said another way, because the data can be immutable, changes to the cache may not involve a read, update, and write cycle; instead, the entity can write to the data store or a cache, without reading data already in the data store or cache and updating the data read from the data store or cache.

Figure 1:
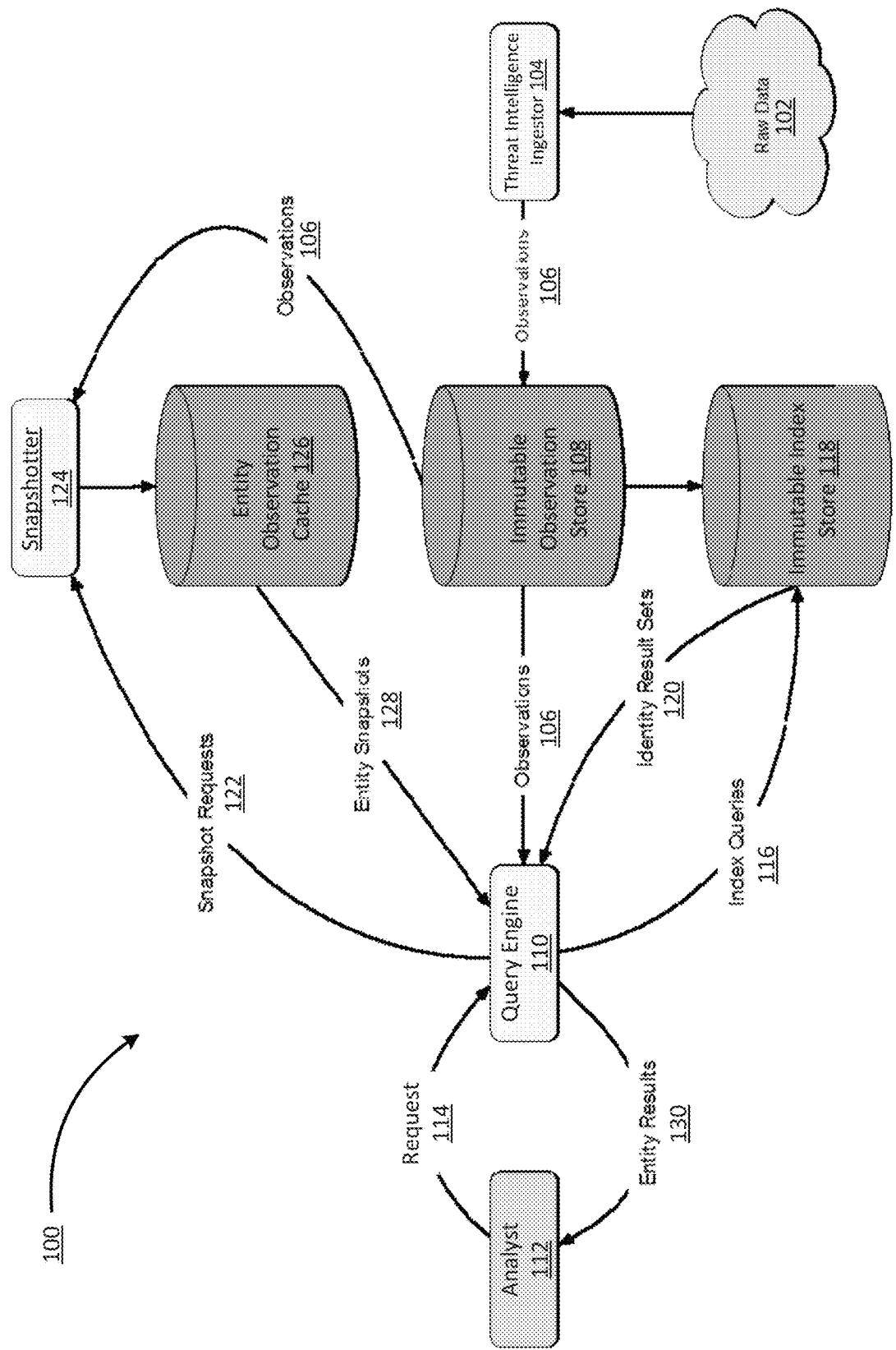
FIG. 1 is a schematic diagram illustrating an intelligence system, according to an embodiment.

FIG. 1 is a schematic diagram illustrating an intelligence system 100. For example, in some implementations, an intelligence system 100 can be a system that can receive raw data 102 (also referred to herein as "intelligence data," "threat intelligence information," and/or "threat intelligence data") relating to information about entities in a network (not shown) managed by an analyst 112 (e.g., the network being a local and/or organizational network including assets associated with a particular organization and/or analyst). In some implementations, the raw data 102 can relate to information about other entities that an analyst 112 may be managing other than network entities, and/or entities otherwise associated with a network. A network entity can be a network device and/or similar network asset that is being monitored by an analyst 112, e.g., so as to detect malware and/or other security threats within the network. The intelligence system 100 can also process the raw data 102 such that the analyst 112 can view the status of various entities in the network. For example, the intelligence system 100 can include a query engine 110, a snapshotter 124, a threat intelligence ingestor 104, and various data stores (including an entity observation cache 126, an immutable observation store 108, and an immutable index store 118). In some implementations, the snapshotter 124 and threat intelligence ingestor 104 can be modules and/or server components of the query engine 110 (as described in further detail in the discussion of FIG. 2). For example, the raw data 102 can be processed by the threat intelligence ingestor 104, so as to generate immutable data structures 106 (also referred to herein as "observations" and "observation data structures"). Immutable data structures 106 can be stored in the immutable observation store 108. An analyst 112 can send a request 114 for status information about entities, to the query engine 110. The query engine 110 can send a query 116 to the immutable index store 118 for identity values, which can uniquely identify information that has been received and processed by the intelligence system 100. The immutable index store 118 can return results 120 of the query (also referred to herein as "identity result sets"), and can use identity values included in the results to search for immutable data structures 106 and/or snapshot data structures 128 from an entity observation cache 126. Snapshot data structures 128 can aggregate information from multiple immutable data structures 106. The snapshotter 124 can, for example, receive the immutable data structures 106 from the immutable observation store 108, and can generate snapshot data structures 128 that aggregate the information in these immutable data structures 106. The query engine 110 can then receive these snapshot data structures 128, and forward the snapshot data structures 128 (along with immutable data structures 106 that represent more recent data, if available) to the analyst 112 for review and analysis.

In some implementations, an analyst 112 can be an entity configured to provide, request, and/or analyze intelligence information 102. For example, an analyst 112 can be a user, network device, compute device, and/or similar entity that can provide intelligence information 102 to the query engine 110, that can send requests to the query engine 110 to determine the status of a network entity (and/or to access an intelligence data timeline including data stored by the query engine 110), and/or can review intelligence information 102 returned by the query engine 110, so as to detect network anomalies and/or send messages to remediate potential network anomalies. For example, the analyst 112 can request status information about a network entity so as to determine whether or not a status of the network entity has unexpectedly changed, to view a timeline of how the status of the network entity has changed over time, and to make a determination as to whether the change of the status of the network entity indicates the existence of a potential security threat, and/or the existence of other potential network issues. The analyst 112 can use this information to then remediate any detected status changes of entities (e.g., can use the information to remove a network entity from the network, to quarantine the network entity, and/or to perform other actions).

Figure 2:
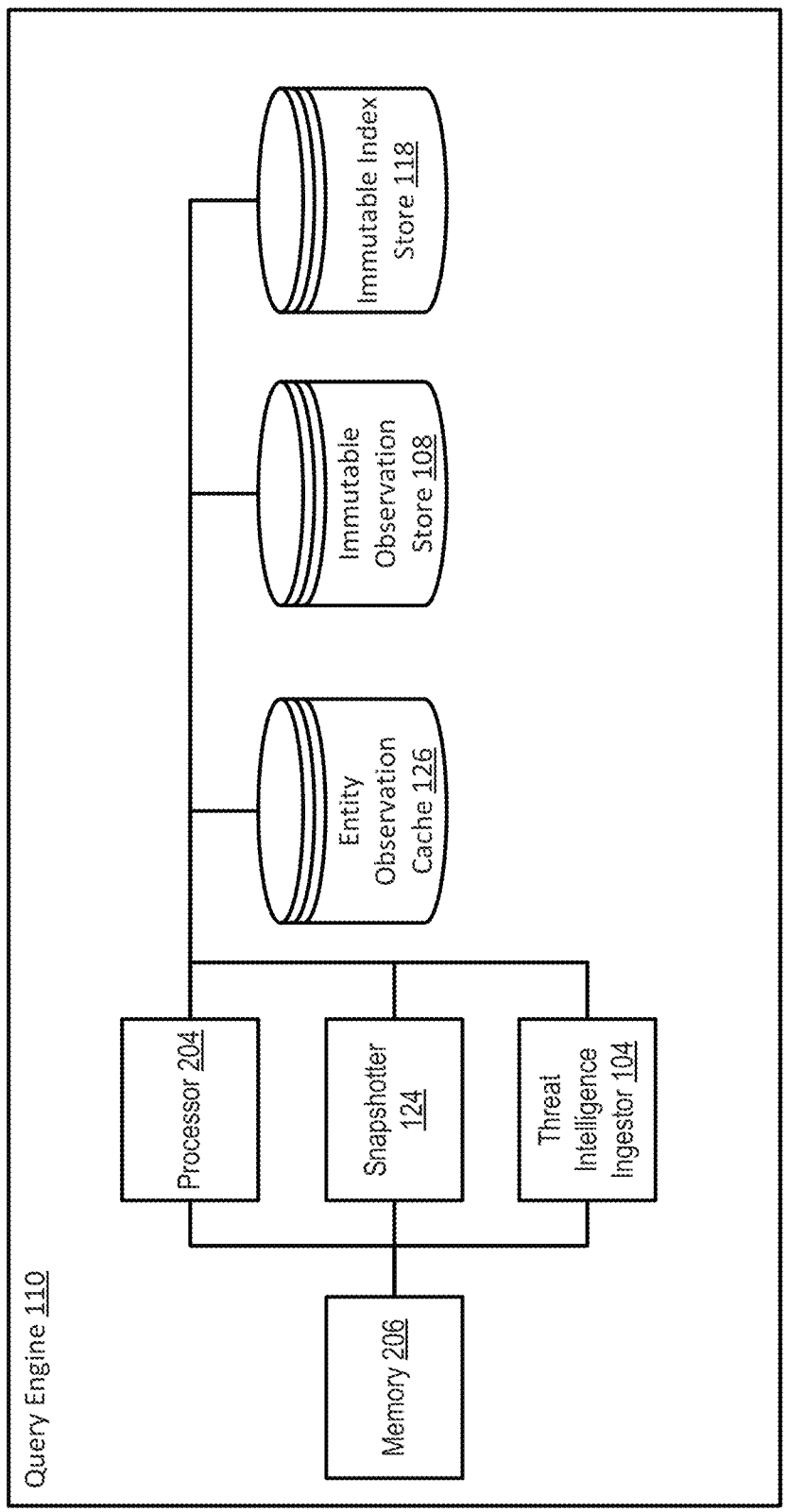
FIG. 2 is a schematic diagram illustrating a query engine, according to an embodiment.

FIG. 2 is a schematic diagram illustrating a query engine 110. For example, in some implementations, the query engine 110 can include at least one processor 204, at least one memory 206, and the snapshotter 124, threat intelligence ingestor 104, entity observation cache 126, immutable observation store 108, and immutable index store 118 as described in the discussion of FIG. 1. The at least one processor 204 can be any hardware module and/or component configured to receive and process data, and/or to execute code representing executable instructions. In some embodiments, the at least one processor 204 can be a general purpose processor, a Field Programmable Gate Array (FPGA), an Application Specific Integrated Circuit (ASIC), a Digital Signal Processor (DSP), and/or the like.

The at least one memory 206 can be a hardware module and/or component configured to store data accessible by the at least one processor 204, and/or to store code representing executable instructions for the at least one processor 204. The memory 206 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 206 stores instructions to cause the processor 204 to execute modules, processes and/or functions associated with the query engine 110.

The at least one processor 204 can implement a number of modules, compute devices, and/or server components, including but not limited to the snapshotter 124 and the threat intelligence ingestor 104. The at least one processor 204 can be configured to execute instructions generated by any of the modules and/or server components, and/or instructions stored in the memory 206. In some implementations, if the query engine 110 includes multiple processors 204, the modules and/or server components can be distributed among and/or executed by the multiple processors 204. The at least one memory 206 can be configured to store processor-readable instructions that are accessible and executable by the at least one processor 204.

In some implementations, the modules, compute devices, and/or server components can be implemented on the processor 204 (e.g., as software executed on and/or implemented by the processor 204). In some implementations, the modules, compute devices, and/or server components can be software stored in the memory 206 and executed and/or instantiated by the processor 204. In other implementations, the modules, compute devices, and/or server components can be any assembly and/or set of operatively-coupled electrical components separate from the processor 204 and the memory 206, including but not limited to field programmable gate arrays (FPGAs) and/or application-specific integrated circuits (ASICs).

In some implementations, the threat intelligence ingestor 104 can be a module and/or server component configured to process intelligence data received from network entities and/or other entities in a network. For example, the threat intelligence ingestor 104 can be implemented by the processor 204, and can receive raw data 102 (e.g., intelligence data and/or threat intelligence data from a network entity and/or other source) relating to a network entity. The raw data can be mutable, unprocessed status data retrieved from the network entity, and/or mutable, unprocessed status data generated for the network entity by another entity (e.g., an analyst, an administrator, and/or a different entity associated with the network entity). The threat intelligence ingestor 104 can generate at least one immutable data structure from the raw data 102. The threat intelligence ingestor 104 can also generate identity values for each immutable data structure, e.g., based on attributes stored in the immutable data structure 106. The threat intelligence ingestor 104 can also store the at least one immutable data structure in the immutable observation store 108, and can store the identity values in the immutable index store 118.

In some implementations, the snapshotter 124 can be a module and/or server component configured to generate snapshot data structures 128 (shown in FIG. 1). For example, the snapshotter 124 can be implemented by the processor 204, and can periodically retrieve immutable data structures 106 (shown in FIG. 1) from the immutable observation store 108, and generate snapshot data structures 128 based on the immutable data structures 106. In some implementations, the snapshotter 124 can retrieve recent immutable data structures 106 (e.g., after a predetermined number of immutable data structures 106 have been retrieved since the last snapshot data structure 128 was generated; after a predetermined time interval has expired; after a threshold number of snapshot data structure 128 have been generated, and/or the like), and can generate a snapshot data structure 128 that includes identifiers of the immutable data structures 106. The snapshotter 124 can also store snapshot data structures 128 in the entity observation cache 126, and can manage stored snapshot data structures 128 (e.g., can delete snapshot data structures 128 that have reached a predetermined age, and/or the like).

In some implementations, the immutable observation store 108 can be a data store (e.g., a relational database and/or similar storage component of the query engine 110) that can store immutable data structures 106. For example, in some implementations, the immutable observation store 108 can store immutable data structure records that have been generated and stored in the immutable data structure data store by the threat intelligence ingestor 104. Each immutable data structure 106 can thus be associated with the network entity with which the raw data 102 used to generate the immutable data structure 106 is associated. Each immutable data structure 106 can include attributes including but not limited to a timestamp indicating when the immutable data structure 106 was generated, a name of a network entity, an address and/or similar identifier for the network entity (e.g., an interne protocol (IP) address, a media access control (MAC) address, and/or the like), a domain of the network entity, classless inter-domain routing (CIDR) standards of the network entity, an autonomous system number (ASN) of the network entity's address and/or similar identifier, a metadata tag of the network entity, a name and/or identifier of an owner of the network entity, a status of the network entity, an identity value of the immutable data structure 106, and/or similar information.

In some implementations, each attribute of the immutable data structure 106 can be subkeys, where each subkey in an immutable data structure 106 can include information to search for additional immutable data structures 106 in the immutable observation store 108. For example, an address and/or similar identifier for a network entity can be a subkey that can be used to further query the immutable observation store 108 to search for other immutable data structures 106 associated with that network entity. In some implementations, relationships between subkeys can be generated when an immutable data structure 106 includes those subkeys. For example, a relationship between an IP address of a network entity, and a domain of the network entity, can be defined and/or expressed when the IP address and the domain are included in the same immutable data structure 106. In some implementations, each subkey can also be associated with a secondary index that can allow for range searches and exact match searches. For example, a secondary index can be an attribute that the snapshotter 124 can use to filter results being retrieved from the immutable observation store 108. For example, to find metadata tags associated with a domain, the snapshotter 124 can query the using the domain (e.g., where the domain attribute acts as a subkey) to generate a results set including immutable data structures 106 with the domain attribute, and can filter the results set by searching within the results set for immutable data structures 106 that include metadata tag fields (e.g., where the metadata tag field can act as a secondary index).

In some implementations, the immutable index store 118 can include records of identity values that have been calculated for immutable data structures 106 stored in the immutable observation store 108. For example, each record in the immutable index store 118 can include an identity value, and/or other metadata that can be used to match the identity value with information in a query for network entity state information. The threat intelligence ingestor 104 can store the identity value in the immutable index store 118, and the snapshotter 104 can later retrieve the identity value for subsequent analysis of status information for a network entity.

In some implementations, an entity observation cache 126 can store snapshot data structures 128, and/or recent immutable data structures 106 from the immutable observation store 108. The entity observation cache 126 can serve as a streamlined data store for retrieving recent state information for entities in the network. A snapshot data structure 128 stored in the entity observation cache 126 can include a snapshot identifier identifying the snapshot data structure 128 record within the entity observation cache 126, identifiers of immutable data structures 106 that have been coalesced into the snapshot data structure 128, identity values associated with the immutable data structures 106 coalesced into the snapshot data structure 128, a timestamp indicating when the snapshot data structure 128 was generated, and/or similar information. The snapshotter 124 can store the snapshot data structure 128 and/or recent immutable data structures 106 in the entity observation cache 126, and can retrieve the snapshot data structure 128 and/or recent immutable data structures 106 in response to the query engine 110 receiving a request for status information. The snapshotter 124 can also store snapshot data structure 128 and/or recent immutable data structures 106 in the entity observation cache 126, when a request for status information includes a request for information that is stored in the immutable observation store 108, but not yet stored in the entity observation cache 126. In this manner, the snapshotter 124 can efficiently synchronize the entity observation cache 126 with the immutable observation store 108, by storing newly-generated immutable data structures 106 in the entity observation cache 126, without having to update information already stored in the entity observation cache 126.

Figure 3:
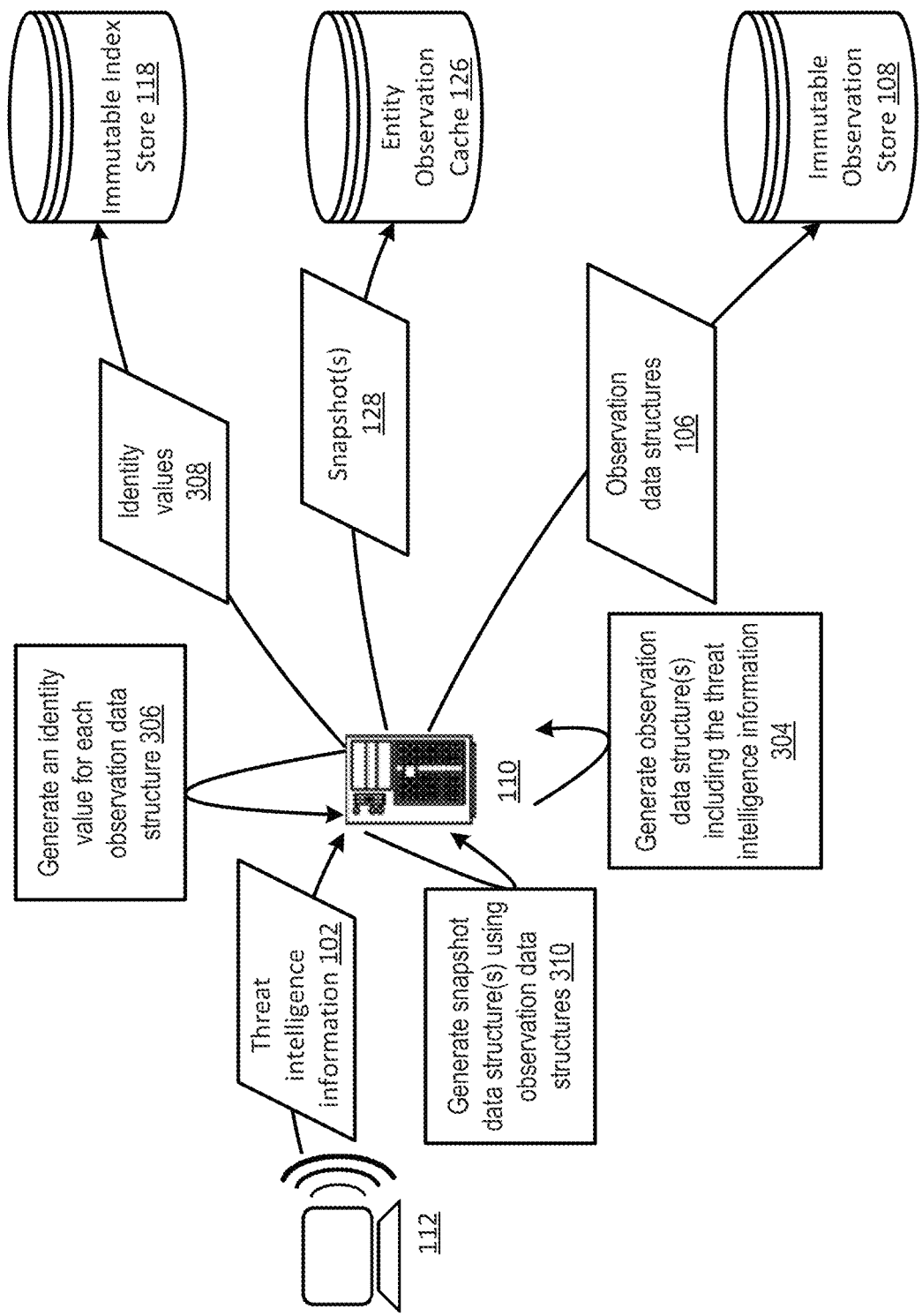
FIG. 3 is a data flow diagram illustrating generating immutable data structures, according to an embodiment.

FIG. 3 is a data flow diagram illustrating generating immutable data structures 106. For example, in some implementations, an analyst 112 (or a network entity and/or other network device) can send intelligence information (also referred to as "raw data 102," as described in the description of FIG. 1) to a query engine 110 (e.g., to a threat intelligence ingestor 104 of the query engine 110), e.g., via a signal 102. The threat intelligence ingestor 104 can, at 304, generate immutable data structures 106 (e.g., observation data structures) that include the intelligence information 102, and can store the observation data structures 106 in the immutable observation store 108. The threat intelligence ingestor 104 can then, at 306, generate an identity value 308 for each observation data structure 106. For example, the threat intelligence ingestor 104 can use at least one attribute of an observation data structure 106 (e.g., such as an entity identifier attribute in the observation data structure 106, a timestamp attribute of the observation data structure 106, an observation description attribute, and/or the like) to generate an identity value 308 that uniquely identifies that observation data structure 106.

Specifically, the threat intelligence ingestor 104 can determine which portion of the observation data structure 106 is unique to that observation data structure 106 (e.g., which portion of the observation data structure 106 includes information not included in other observation data structures 106 in the immutable observation store 108), and can generate a cryptographic hash value of that portion of the observation data structure 106. For example, in some implementations, the threat intelligence ingestor 104 can identify attributes unique to a type of entity with which an observation data structure 106 is associated. If an observation data structure 106 is associated with a person, the threat intelligence ingestor 104 can determine that a name or other identifier included in the observation data structure 106 would include information unique to that observation data structure 106, and can generate a cryptographic hash value of the name or other identifier included in the observation data structure 106 (e.g., in addition to the timestamp attribute of the observation data structure 106, the observation description attribute, and/or the like). As another example, if the observation data structure 106 is associated with an organization, the threat intelligence ingestor 104 can determine that a company name attribute of the observation data structure 106 would uniquely identify an organization associated with the observation data structure 106, and can generate a cryptographic hash value of the company name (e.g., in addition to the timestamp attribute of the observation data structure 106, the observation description attribute, and/or the like) when the observation data structure 106 is identified as being associated with an organization entity. As another example, if the observation data structure 106 is associated with a network entity, the threat intelligence ingestor 104 can generate a cryptographic hash value of an IP address included in the observation data structure 106. In other implementations, the threat intelligence ingestor 104 can generate a cryptographic hash value using the values of each of the attributes of an observation data structure (when an entity associated with the observation data structure cannot be determined, and/or regardless of the entity associated with the observation data structure). The cryptographic hash value can be the identity value 308. The threat intelligence ingestor 104 can store the observation data structures 106, keyed to the identity values 308, in the immutable index store 118.

The snapshotter 124 (e.g., of the query engine 110, as shown in FIG. 1) can periodically generate, at 310, snapshot data structures 128 based on observation data structures 106 stored in the immutable observation store 108, and can store the snapshot data structures 128 in the entity observation cache 126 (e.g., keyed to an identity value generated using identifying information of an entity associated with the snapshot data structure 128). For example, the snapshotter 124 can retrieve a set of observation data structures generated within a given time period (e.g., between a determined start time and a determined termination time), and can generate a snapshot data structure 128 that includes data from each observation data structure 106 generated during that time period. In some implementations, for example, the time period can be a time period with a start time of the timestamp of the most recent snapshot data structure 128, and with a termination time of a current system time. In some implementations, snapshot data structures 128 can include observation data structures 106 that have been generated over overlapping time periods (e.g., a first snapshot data structure 128 can include observation data structures 106 from a first time period, and a second snapshot data structure 128 can include some observation data structures 106 from the first time period, and some observation data structures 106 from a second time period).

Figure 4:
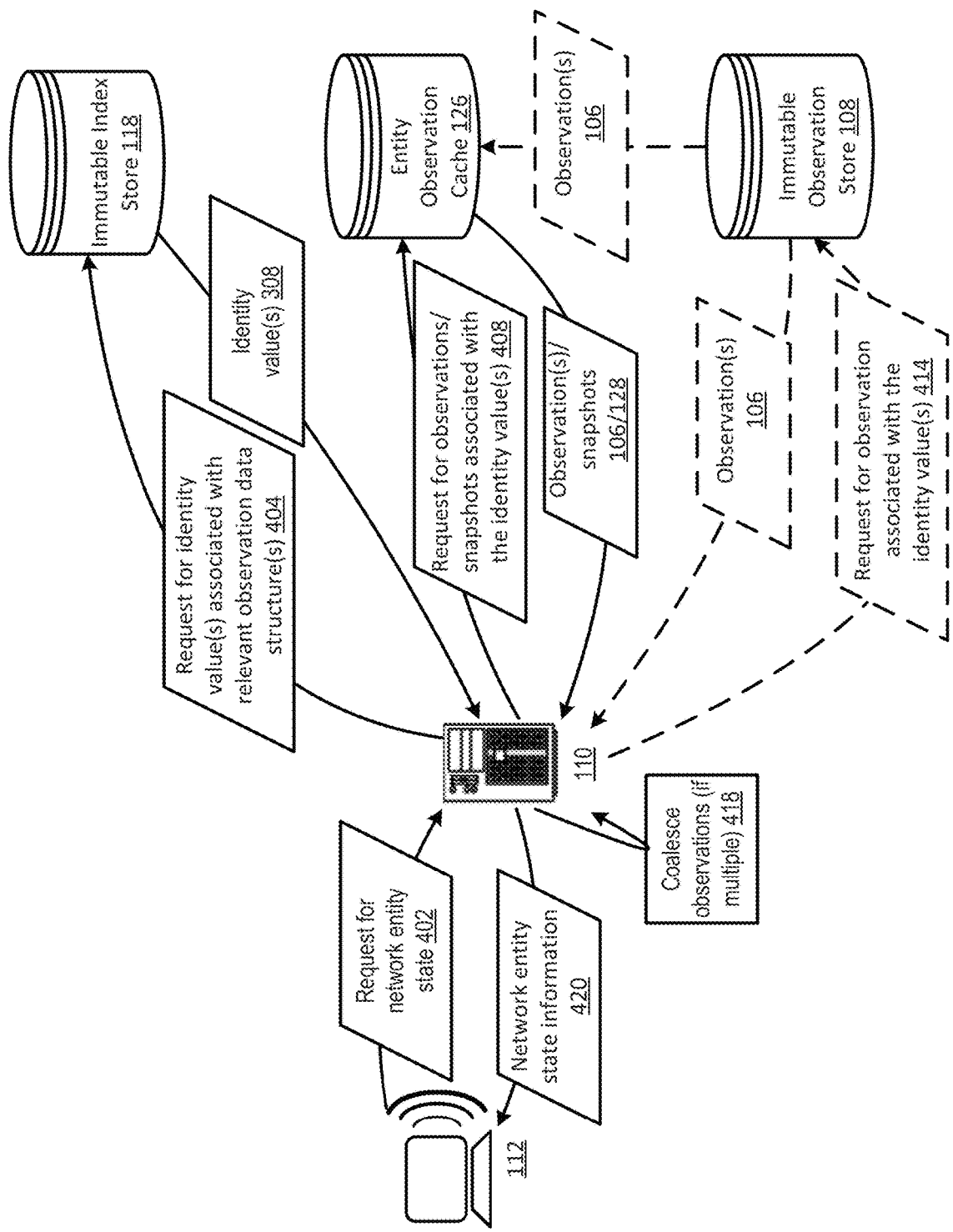
FIG. 4 is a data flow diagram illustrating retrieving network entity state information, according to an embodiment.

FIG. 4 is a data flow diagram illustrating retrieving network entity state information. For example, in some implementations, an analyst 112 can request network entity state information from the query engine 110, e.g., via sending a signal 402 to the query engine 110. The query engine 110 can, via the snapshotter 124 (e.g., of the query engine 110, as shown in FIG. 1), send a request 404 for identity values 308 associated with relevant observation data structures 106. Said another way, the snapshotter 124 can use information in the request to search the immutable index store 118, to retrieve identity values 308 that may be associated with observation data structures 106 and/or snapshot data structures 128 that include information relevant to the request. When the snapshotter 124 receives the identity values 308, from the immutable index store 118 that includes results of the query 404, the snapshotter 124 of the query engine 110 can send a query 408 the entity observation cache 126 for snapshot data structures 128 and/or observation data structures 106 that include at least one of the identity values 308 retrieved from the immutable index store 118. Matching observation data structures 106 and/or snapshot data structures 128 can be returned as results from the entity observation cache 126. If the entity observation cache 126 does not include snapshot data structures 128 and/or observation data structures 106, the snapshotter 124 may then query 414 the immutable observation store 108 for observation data structures 106 that include at least one of the identity values 308 retrieved from the immutable index store 118. If the snapshotter 124 receives observation data structures 106 from the immutable observation store 108, as results of the query, the snapshotter 124 can also store the observation data structures 106 in the entity observation cache 126. If the snapshotter 124 receives more than one observation data structure 106 from either the entity observation cache 126, or the immutable observation store 108, the snapshotter 124 can, at 418, coalesce the observation data structures 106 into a new snapshot data structure 128, that can be stored in the entity observation cache 126. For example, the snapshotter 124 can link the observation data structures 106 together within the new snapshot data structure 128, e.g., by storing identifiers and identity values associated with each of the observation data structures 106 in the snapshot data structure 128. As another example, the snapshotter 124 can store information from each of the observation data structures 106 within the new snapshot data structure 128, so as to combine the information stored in each observation data structures 106 into a single data structure. The snapshotter 124 can then send the snapshot data structure 128, and/or information included in the observation data structures 106 included in the snapshot data structure 128, to the analyst 112 for processing, e.g., via a signal 420 to the analyst 112 and/or a device associated with the analyst 112.

Figure 5:
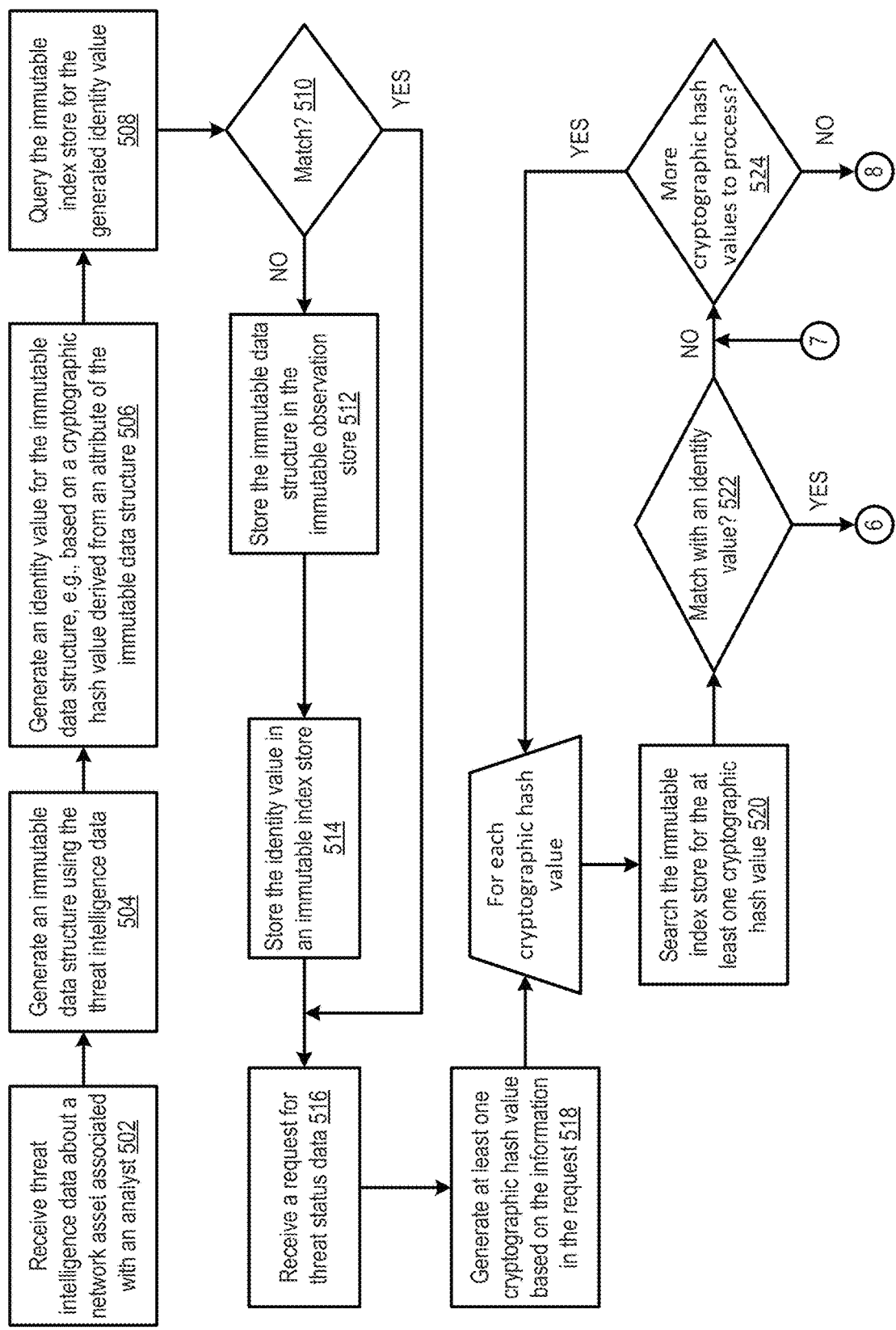
FIG. 5 is a logic flow diagram illustrating generating immutable data structures and identity values, according to an embodiment.
Figure 6:
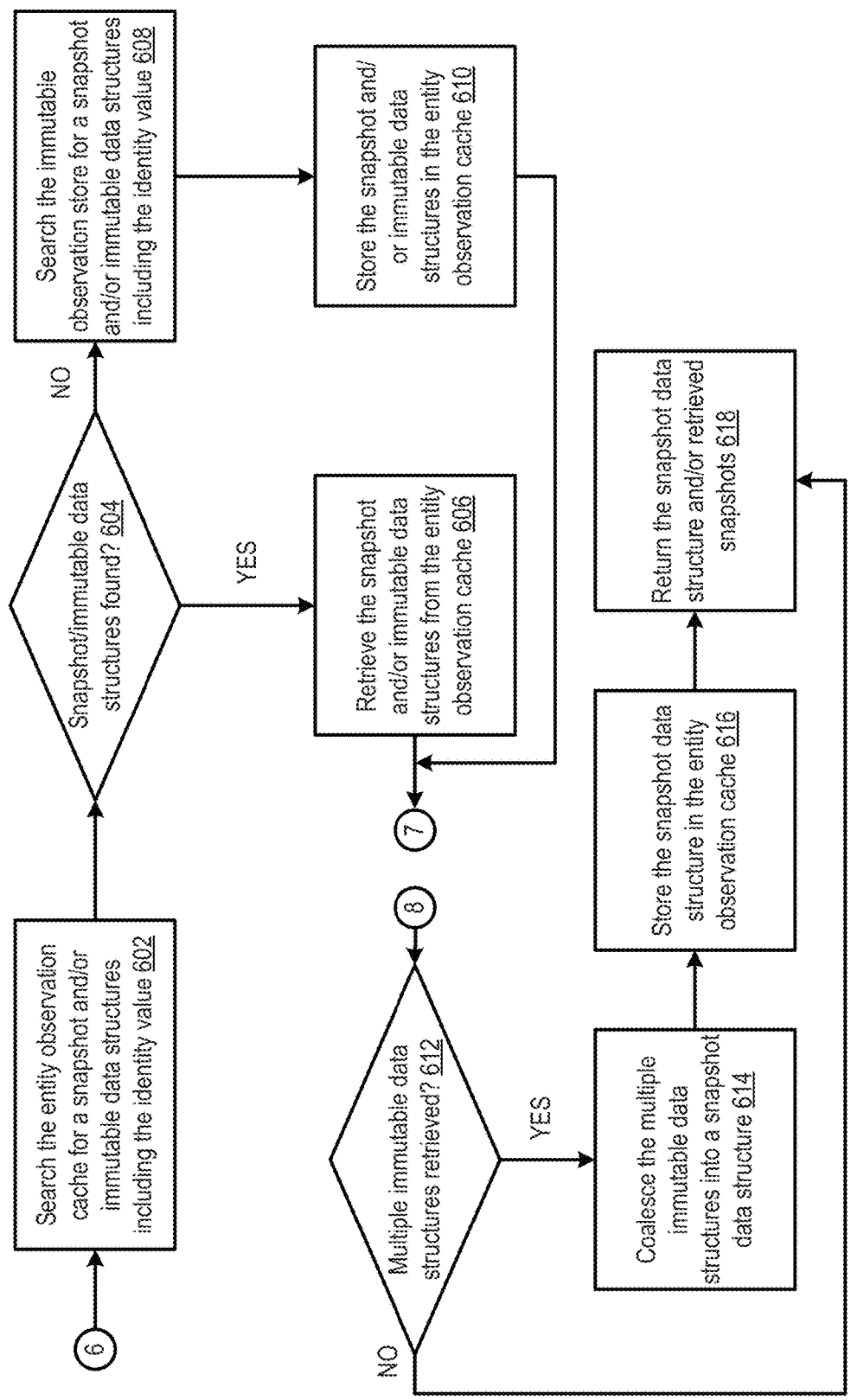
FIG. 6 is a logic flow diagram illustrating retrieving network entity state information as generated in FIG. 5, according to an embodiment.

FIGS. 5-6 are logic flow diagrams further illustrating the processes of generating immutable data structures 106 and identity values 308 and searching for network entity status information via a query engine 110, as described in FIGS. 3-4. For example, in some implementations, a query engine 110 (specifically, a threat intelligence ingestor 104 of the query engine 110) can, at 502, receive intelligence data 102 (also referred to herein as raw data 102) about a network asset and/or entity associated with an analyst 112 and included in a network. The intelligence data 102 can be received from the analyst 112, from the network asset and/or entity itself, from a different network asset and/or entity within the network, and/or a network entity outside the network. The threat intelligence ingestor 104 can, at 504, generate one or more immutable data structure (also referred to herein as an observation data structure) using the intelligence data 102 (e.g., can generate an immutable data structure that includes the intelligence data 102). The threat intelligence ingestor 104 can also, at 506, generate an identity value 308 for each of the one or more immutable data structure 106, e.g., based on a cryptographic hash value 308 derived from an attribute of the immutable data structure 106. For example, the threat intelligence ingestor 104 can determine an attribute of the immutable data structure 106 that makes an immutable data structure 106 unique in comparison to immutable data structures 106 stored in the immutable observation store 108 (e.g., such as a timestamp of the immutable data structure 106, and/or other attributes), and can generate a cryptographic hash value 308 using that attribute. The threat intelligence ingestor 104 can also use non-unique information included in the immutable data structure 106 to generate the cryptographic hash value 308.

The threat intelligence ingestor 104 can, at 508, query the immutable index store 118 for the generated identity value 308, e.g., to determine whether or not the identity value 308 is already stored in the immutable index store 118 (and therefore to determine whether or not an immutable data structure including the same information has already been stored in the immutable observation store 108). If the threat intelligence ingestor 104 does not, at 510, detect a match between an identity value 308 stored in the immutable index store 118 and the identity value 308 generated at 506, the threat intelligence ingestor 104 can, at 512, store the immutable data structure in the immutable observation store 108, and, at 514, can store the identity value 308 in the immutable index store 118. If, at 510, the threat intelligence ingestor 104 does detect a match between the identity value 308 generated at 506 and an identity value 308 stored in the immutable index store 118, the threat intelligence ingestor 104 can determine that an immutable data structure 106 including the same and/or similar information has already been generated and stored by the threat intelligence ingestor 104, and the threat intelligence ingestor 104 may not store the immutable data structure 106, or the identity value 308.

The processor 204 can, at 516, receive a request for threat status data. The processor 204 can, at 518, generate at least one cryptographic hash value 308 that is correlated with information included in the request. For example, if a request for intelligence information 102 includes a query instruction "Search: IP:192.168.0.10 AND owner:John Smith" the processor 204 can generate a first identity value 308 by calculating a cryptographic hash value 308 for the IP address value included in the request, and can also calculate a second identity value 308 by calculating a cryptographic hash value 308 of the "owner" portion of the request. Said another way, for some portion of the attributes included in the request, the processor 204 can generate an identity value 308 for each of those attributes, by calculating cryptographic hash values 308 using those attributes.

The query engine 110 (specifically, the snapshotter 124) can then query data stores to find intelligence status data that is correlated with the cryptographic hash values 308 generated from the data included in the request. For example, the snapshotter 124 can, for each cryptographic hash value 308, search, at 520, the immutable index store 118 for the cryptographic hash value 308. Specifically, the snapshotter 124 can search the immutable index store 118 to determine whether or not the immutable index store 118 includes an identity value 308 that matches the cryptographic hash value 308. If, at 522, the snapshotter 124 matches a cryptographic hash value 308 with an identity value 308 stored in the immutable index store 118, the snapshotter 124 (referring to FIG. 6) can, at 602, search the entity observation cache 126 for a snapshot data structure 128 and/or immutable data structures 106 that include, and/or are associated with, the identity value 308. For example, each immutable data structure and/or snapshot data structure 128 can include an identity value 308 calculated based on attributes in that immutable data structure 106 and/or snapshot data structure 128; the snapshotter 124 can search the entity observation cache 126 that includes the identity value 308 retrieved from the immutable index store 118. The snapshotter 124 can, at 604, determine whether or not any snapshot data structures 128 and/or immutable data structures 106 in the entity observation cache 126 include the identity value 308, e.g., by determining whether or not the results of the query included any snapshot data structures 128 and/or immutable data structures 106. The snapshot data structures 128 and/or immutable data structures 106 included in the results of the query can be the intelligence status data being requested.

If a snapshot data structure 128 and/or at least one immutable data structure 106 was included in the results of the query, the snapshotter 124 can, at 606, retrieve that snapshot data structure 128 and/or immutable data structure 106 from the entity observation cache 126, and can keep track of which snapshot data structure 128 and/or immutable data structures 106 were retrieved (e.g., by adding the data structures to a results queue, and/or the like). If, at 604, the snapshotter 124 determines that the identity value 308 is not included in and/or associated with the snapshot data structures 128 or the observation data structures 106 in the entity observation store 126, the snapshotter 124 can, at 608, search the immutable observation store 108 for a snapshot data structure 128 and/or immutable data structures 106 that include that identity value 308. The snapshotter 124 can also, at 610, store any snapshot data structures 128 and/or immutable data structures 106 that are retrieved from the query to the immutable observation store 108, in the entity observation cache 126. Returning to FIG. 5, the snapshotter 124 can then, at 524, check to determine whether or not there are additional cryptographic hash values 308 to search for in the immutable index store 118, and can continue to process the remaining cryptographic hash values 308 in this manner.

If, at 522, the snapshotter 124 does not find an identity value 308 in the immutable index store 118 that matches that cryptographic hash value 308, the snapshotter 124 can, at 524, determine whether or not there are additional cryptographic hash values 308 for which a search has not yet been performed. The snapshotter 124 can continue to search the immutable index store 118 for each remaining cryptographic hash value 308 that was generated from the information in the request, if there are additional cryptographic hash values 308 to search. If the snapshotter 124 has searched for each of the generated cryptographic hash values 308, then (referring to FIG. 6, at 612), the snapshotter 124 can determine whether or not multiple immutable data structures 106 were retrieved for the request (e.g., if multiple immutable data structures 106 are being stored in the results queue). If the results queue includes multiple immutable data structures 106, the snapshotter 124 can, at 614, coalesce the multiple immutable data structures 106 into a new snapshot data structure 128 that can, at 616, be stored in the entity observation cache 126. For example, the snapshotter 124 can generate a new snapshot data structure 128 including identifiers for each of the immutable data structures 106 in the queue. Alternatively, the snapshotter 124 can generate a new snapshot data structure 128 that includes data from each of the immutable data structures 106.

The snapshotter 124 can then, at 618, return the new snapshot data structure 128 to the analyst 112, e.g., as a response to the request for the intelligence information. If the snapshotter 124, at 612, determines that there are not multiple immutable data structures 106 that can be coalesced, the snapshotter 124 can, at 618, return the snapshot data structures 128 that were retrieved from the entity observation cache 126 and/or the immutable observation store 108, and/or the immutable data structure 106 that was retrieved from the entity observation cache 126 and/or the immutable observation store 108, that is stored in the results queue.

Figure 7:
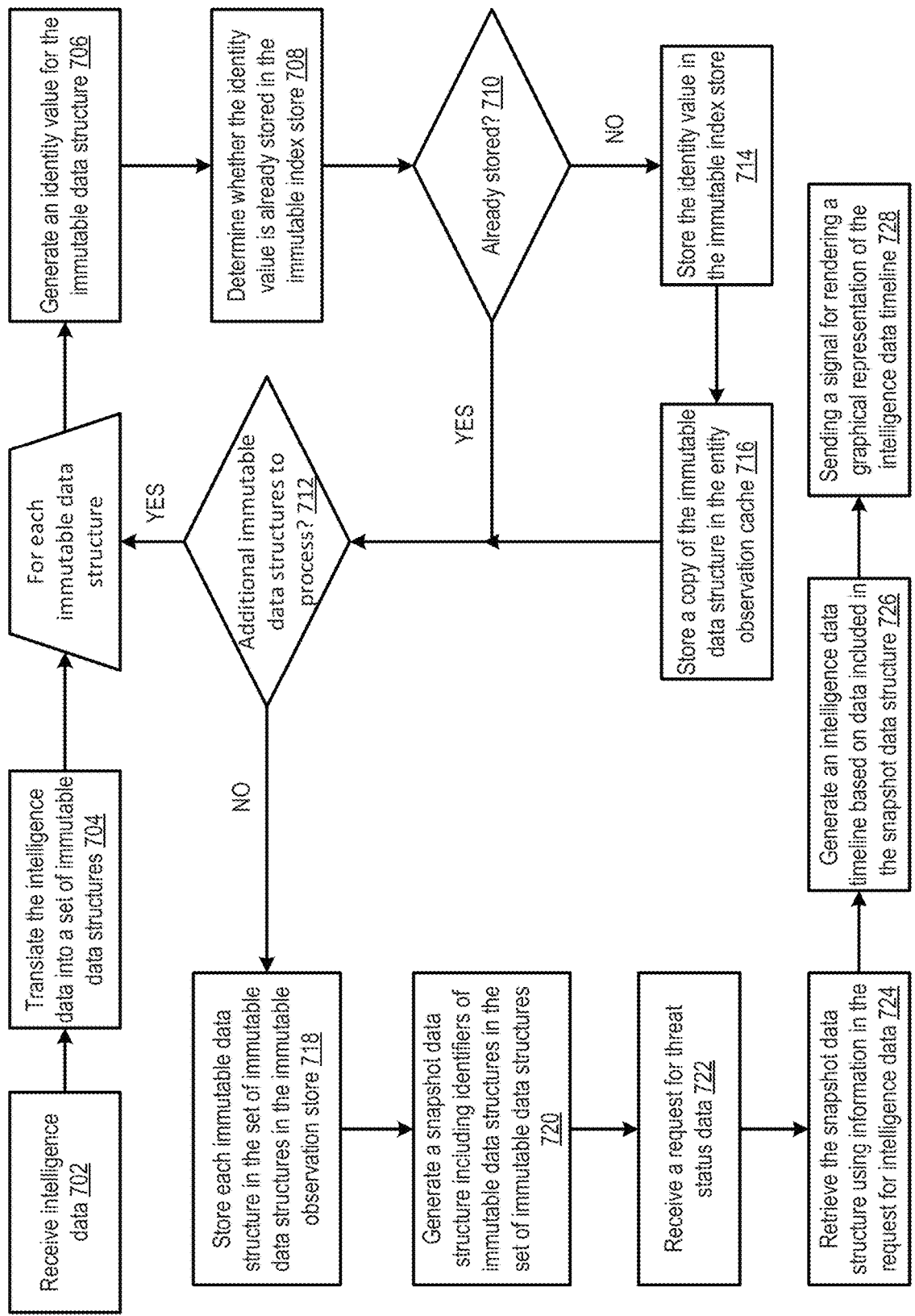
FIG. 7 is logic flow diagram illustrating generating intelligence data timelines, according to an embodiment.

FIG. 7 is logic flow diagram illustrating generating intelligence data timelines. For example, in some implementations, an intelligence data timeline can be an interface that displays a temporal relationship between immutable data structures 106 and/or snapshot data structures 128. For example, the intelligence data timeline can display information stored in a set of immutable data structures 106, and/or a set of snapshot data structures 128, ordered and/or displayed based on a timestamp included in each immutable data structure 106 and/or snapshot data structure 128, and/or based on other information that can be used to order the immutable data structures 106, and/or a set of snapshot data structures 128.

Figure 8:
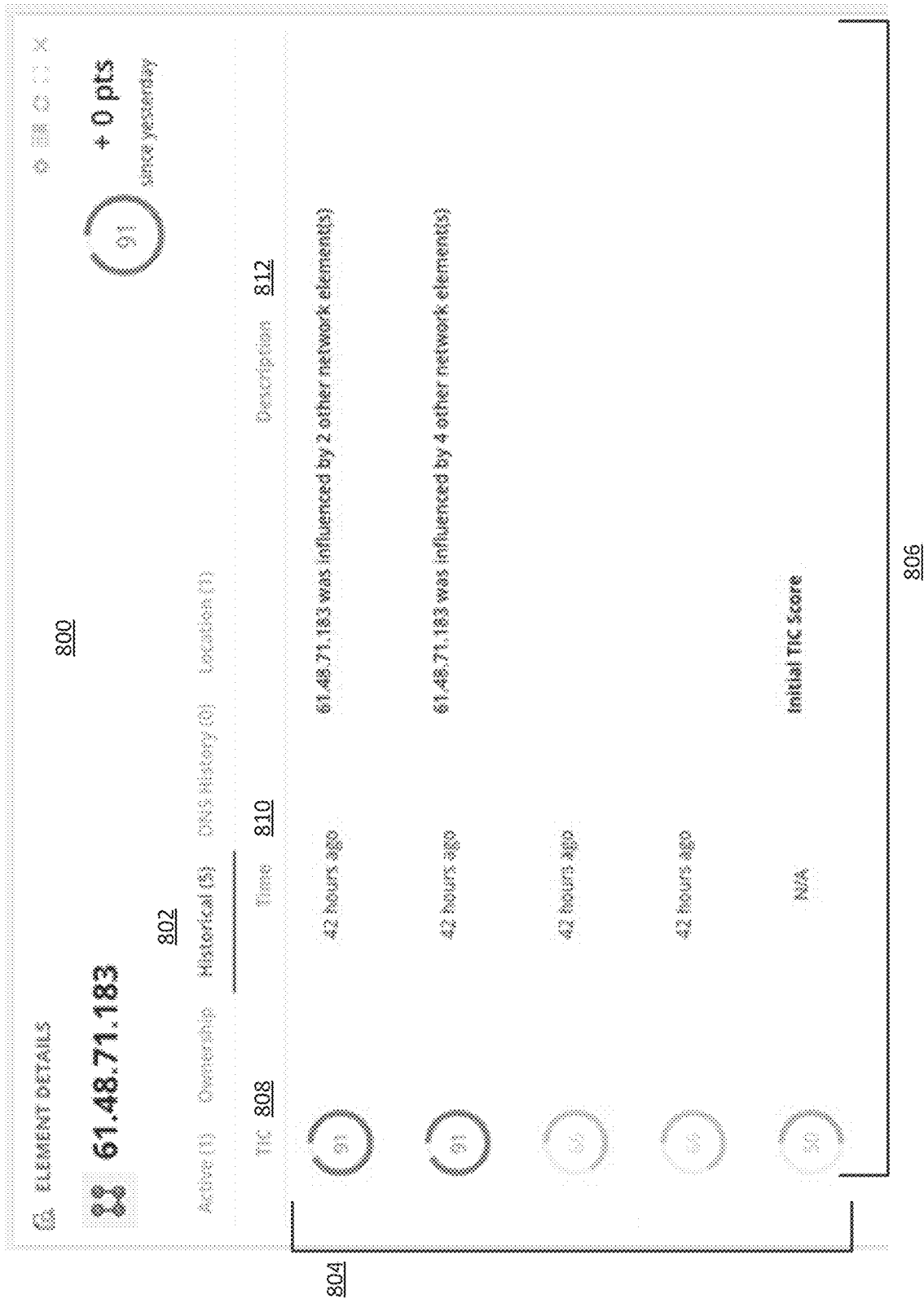
FIG. 8 is screenshot diagram illustrating intelligence data timelines, according to an embodiment.

For example, referring to FIG. 8, in some implementations, the processor 204 can generate a general user interface 800 for displaying data relating to an asset and/or other entities. By clicking on a timeline view 802 within the user interface (e.g., a "Historical" tab 802 of the user interface, and/or the like), the processor can render an intelligence data timeline 804 including a chronological timeline of changes to various attributes 806 of the given asset and/or entity. For example, the intelligence data timeline 804 can include threat scores 808, timestamps 810 indicating when changes to the attributes 806 were made, descriptive text 812 describing differences between the entries within the intelligence data timeline 804, and/or the like. The intelligence data timeline 804 can further include attributes such as, but not limited to, network addresses (e.g., such as IP addresses, and/or the like), entities associated with the asset and/or entity, and/or other attributes. The timeline view 802 can be updated substantially in real-time, e.g., based on additional immutable data structures 106 and/or snapshot data structures 128 generated from intelligence data received at the query engine 110.

Returning to FIG. 7, in some implementations, the threat intelligence ingestor 104 can, at 702, receive intelligence information 102. The threat intelligence ingestor 104 can, at 704, translate the intelligence information 102 into a set of immutable data structures 106. For example, the threat intelligence ingestor 104 can generate the set of immutable data structures 106, by using status information extracted from the intelligence information 102 to generate one or more immutable data structures 106. The threat intelligence ingestor 104 can, for each immutable data structure 106 in the set of immutable data structures, determine whether or not a similar immutable data structure 106 has already been stored by the threat intelligence ingestor 104. For example, the threat intelligence ingestor 104 can, at 706, generate an identity value 308 for the immutable data structure and, at 708, can determine whether or not the identity value 308 generated for the immutable data structure is already stored in the immutable index store 118.

If, at 710, the threat intelligence ingestor 104 determines that the identity value 308 is already stored in the immutable index store 118, the threat intelligence ingestor 104 can, at 712, determine whether or not there are additional immutable data structures 106 to process, and can continue to check the remaining immutable data structures 106. If, at 710, the threat intelligence ingestor 104 determines that the identity value 308 is not already in the immutable index store 118, the threat intelligence ingestor 104 can store, at 714, the identity value 308 in the immutable index store 118 and can, at 716, also store a copy of the immutable data structure in the entity observation cache 126. The threat intelligence ingestor 104 can then, at 712, check to determine whether or not there are additional immutable data structures 106 to process, and can continue to check the remaining immutable data structures 106.

When, at 712, the threat intelligence ingestor 104 determines that there are not additional immutable data structures 106 to process, the threat intelligence ingestor 104 can, at 718, store each immutable data structure in the set of immutable data structures 106 in the immutable observation store 108. The snapshotter 124 can, at 720, generate a snapshot data structure 128 that includes identifiers of the immutable data structures 106 in the set of immutable data structures. The processor 204 can, at 722, receive a request for intelligence data and can, at 724, retrieve the snapshot data structure 128, using information in the request for intelligence data. For example, using a process similar to that described in FIGS. 5-6, the processor 204 can compare identity values 308 generated using information in the request, to determine a snapshot data structure 128 that matches the criteria specified in the request. The processor 204 can also, at 726, generate an intelligence data timeline based on data included in the snapshot data structure 128. Specifically, the processor 204 can generate a graphical representation of a timeline, and can render data from immutable data structures 106 associated with the snapshot data structure 128, within the graphical representation of the timeline. For example, if the immutable data structures 106 included in the snapshot data structure 128 were generated within the same day, the processor 204 can generate a graphical representation of an intelligence data timeline that spans twenty-four hours, where a representation of each immutable data structure 106 is arranged within the intelligence data timeline based on a timestamp of that immutable data structure. In this manner, the processor 204 can define an intelligence data timeline in which an analyst 112 can view a temporal relationship between the immutable data structures 106 that have been coalesced into the snapshot data structure 128. In some implementations, the processor 204 can, instead of rendering representations of the immutable data structures 106 within the intelligence data timeline, can render representations of other snapshot data structures 128 within the intelligence data timeline, so as to generate a graphical representation of an intelligence data timeline of snapshot data structures 128. The processor 204 can then, at 728, send a signal to the analyst 112, so as to render the graphical representation of the intelligence data timeline at a device associated with the analyst 112, and/or at a display of the analyst 112. In other implementations, the snapshotter 124 can send a signal to the analyst including the immutable data structures 106 and/or snapshot data structures 128, duch that a device associated with the analyst can render a intelligence data timeline based on the immutable data structures 106 and/or snapshot data structures 128.

In some implementations, relationships between immutable data structures 106 can be defined based on attributes of the immutable data structure. For example, in some implementations, if an immutable data structure includes an attribute with a similar value as another immutable data structure (e.g., a difference between the attribute value of the immutable data structure and the attribute value of the other immutable data structure falls below a predetermined threshold), the similar values can implicitly define a relationship between the two immutable data structures 106.

By storing immutable data structures 106 as described with respect to FIGS. 3-7, a query engine 110 can quickly process and store intelligence data, without using resource and time-intensive read and/or update cycles to update existing data in the query engine 110 data stores. Specifically, by storing immutable data structures 106, the query engine 110 can store new intelligence data as new data structures that need not be updated and/or modified when new intelligence data is received. Instead, the query engine 110 can generate new immutable data structures 106 when new intelligence data is received, and can delete expired immutable data structures 106 as appropriate (e.g., can delete immutable data structures when an age of the immutable data structures 106 has exceeded a data age threshold). In this manner, the immutable observation store 108 and entity observation cache 126 can be updated with new data, without reading and modifying data already stored in either data store. This process can save processing time and data, in comparison to processes that update existing records in the data stores when new intelligence data is received. Additionally, by generating new immutable data structures 106 rather than updating existing data structures, the query engine 110 can more efficiently synchronize a cache that is storing the most recent threat information, with a data store storing intelligence data. For example, instead of reviewing the data stored in the cache to determine data to delete and/or modify in the cache, the query engine 110 can simply store new immutable data structures 106 in the cache.

Additionally, by storing immutable data structures 106 and generating snapshot data structures 128 as described with respect to FIGS. 3-7, the query engine 110 can generate interfaces through which an analyst 112 can determine how status information for entities in a network have changed over time. By generating new data structures, rather than updating existing data structures, the query engine 110 can keep records of past status information, such that an analyst 112 can request and view status information received during a given timeframe. This allows an analyst 112 to view the context and/or progression of a network entity's current status, so as to allow the analyst 112 to make more informed decisions as to whether a current status of the network entity indicates a potential malware infection, and/or indicates other network anomalies.

While systems and methods herein describe processing intelligence data in a network, it is understood that systems and methods herein can be used to process various types of data that can change and/or be updated over time. Additionally, it is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. An apparatus, comprising:
a processor configured to convert network intelligence data into at least one data structure, the processor configured to store the at least one data structure in a data store, the processor configured to calculate an identity value for each of the at least one data structure so as to generate a first set of identity values, the at least one data structure being immutable such that data represented in the at least one data structure is not modified, the identity value for each of the at least one data structure being a cryptographic hash value derived from at least one attribute of the at least one data structure; and
a query engine implemented by the processor and configured to receive a request for intelligence status data, the query engine configured to query an index data store for a second set of identity values correlated with data included in the request, the index data store storing each identity value from the first set of identity values calculated for each of the at least one data structure, the query engine configured to retrieve, from the data store, intelligence status data correlated with each identity value in the second set of identity values, the query engine configured to return a snapshot data structure representing at least a portion of the intelligence status data correlated with each identity value in the second set of identity values, in response to the request.

2. The apparatus of claim 1, wherein:
the intelligence status data is first intelligence status data;
the processor is configured to receive second intelligence status data, the processor configured to generate a set of data structures based on the second intelligence status data, the set of data structures being new immutable versions of the at least one data structure,
the processor is configured to calculate an identity value for each data structure from the set of data structures, each identity value for each data structure from the set of data structures matching an identity value in the first set of identity values.

3. The apparatus of claim 1, wherein the snapshot data structure includes references to a plurality of data structures including the at least one data structure, the plurality of data structures being generated within a predetermined period of time defined by a start of a first time and a termination of the first time.

4. The apparatus of claim 1, wherein the intelligence status data includes data from a most recently defined data structure that has been generated from the network intelligence data.

5. The apparatus of claim 1, wherein:
the query engine is configured to coalesce the intelligence status data to produce coalesced intelligence status data, when more than one data structure is included in the intelligence status data, the portion of the intelligence status data, correlated with each identity value in the second set of identity values, being the coalesced intelligence status data; and the query engine is configured to include the coalesced intelligence status data in the snapshot data structure when returning the snapshot data structure.

6. An apparatus, comprising:
a processor configured to convert intelligence input into a set of immutable data structures,
the processor configured to generate an identity value for each immutable data structure from the set of immutable data structures, each identity value being a cryptographic hash value derived from at least one attribute of the associated immutable data structure, the processor configured to query a data store using an identity value of an immutable data structure from the set of immutable data structures and
the processor configured to store at least one immutable data structure from the set of immutable data structures in an immutable data structure data store when the associated identity value is not found in the data store, the processor configured to store a copy of the associated identity value in the data store; and
a query engine operatively coupled to the processor and configured to receive a request for network intelligence data, the query engine configured to retrieve a portion of immutable data structures stored in the immutable data structure data store based on the request, the query engine configured to generate an intelligence timeline based on data from each immutable data structure from the portion of immutable data structures, the query engine configured to render a graphical representation of the intelligence timeline in a graphical interface, the intelligence timeline representing known states of network elements associated with each immutable data structure from the portion of immutable data structures.

7. The apparatus of claim 6, wherein the at least one attribute of the immutable data structure distinguishes the immutable data structure from other immutable data structures in the set of immutable data structures.

8. The apparatus of claim 6, wherein the data store stores a plurality of identity values associated with a plurality of immutable data structures including the set of immutable data structures.

9. The apparatus of claim 6, wherein:
the immutable data structure is a first immutable data structure,
the data store stores a plurality of identity values associated with a plurality of immutable data structures including the set of immutable data structures, and
the processor configured to query the data store so as to determine whether a second immutable data structure is already stored at the immutable data structure data store.

10. The apparatus of claim 6, wherein the immutable data structure data store is separate and remote from the data store.

11. The apparatus of claim 6, wherein the data store stores a representation of network intelligence data stored at the immutable data structure data store.

12. The apparatus of claim 6, wherein:
each immutable data structure from the set of immutable data structures includes a plurality of subkeys, such that querying the immutable data structure data store for a subkey from the plurality of subkeys returns an immutable data structure from the set of immutable data structures that is associated with that subkey, and
each subkey from the plurality of subkeys is associated with a secondary index, such that a range of possible immutable data structures from the set of immutable data structures can be retrieved based on the secondary index.

13. A method, comprising:
receiving network intelligence data;
translating the network intelligence data into a set of immutable data structures;
storing each immutable data structure in the set of immutable data structures in an immutable data structure data store;
calculating an identity value for each immutable data structure from the set of immutable data structures, the identity value for each immutable data structure from the set of immutable data structures being a cryptographic hash value derived from at least one attribute of an associated immutable data structure from the set of immutable data structures;
generating a snapshot data structure including a set of identifiers, each identifier in the set of identifiers being associated with an immutable data structure in the set of immutable data structures;
receiving a request for the network intelligence data;
generating a network intelligence data timeline based on data included in the snapshot data structure; and
sending a signal to cause rendering of a graphical representation of the network intelligence data timeline in an interface.

14. The method of claim 13, wherein each immutable data structure in the set of immutable data structures includes a timestamp,
the method further comprising:
deleting an immutable data structure in the set of immutable data structures from the immutable data structure data store when an age of the immutable data structure is higher than a predetermined threshold, the age of the immutable data structure being based on the timestamp of the immutable data structure.

15. The method of claim 13, wherein the network intelligence data is first network intelligence data, the set of immutable data structures is a first set of immutable data structures, the snapshot data structure is a first snapshot data structure, the first snapshot data structure being generated at a first time;
the method further comprising:
receiving second network intelligence data;
translating the second network intelligence data into a second set of immutable data structures;
storing each immutable data structure in the second set of immutable data structures in the immutable data structure data store;
generating, at a second time after the first time, a second snapshot data structure including a set of identifiers being associated with an immutable data structure in the second set of immutable data structures.

16. The method of claim 13, wherein the snapshot data structure is a first snapshot data structure generated at a first time, the method further comprises:
generating a second snapshot data structure at a second time after the first time, the second snapshot data structure including a set of identifiers each being associated with a second set of immutable data structures stored after the first time, the second snapshot data structure being generated when a number of immutable data structures in the second set of immutable data structures exceeds a predetermined threshold.

17. The method of claim 13, wherein the immutable data structure data store is a first immutable data structure data store;
the method further comprising:
syncing the first immutable data structure data store with a second immutable data structure data store separate from the first immutable data structure data store so as to store a copy of the set of immutable data structures at the second immutable data structure data store.

* * * * *